June 19, 1934.  H. A. CLARK  1,963,937
OIL SEAL
Filed March 7, 1932
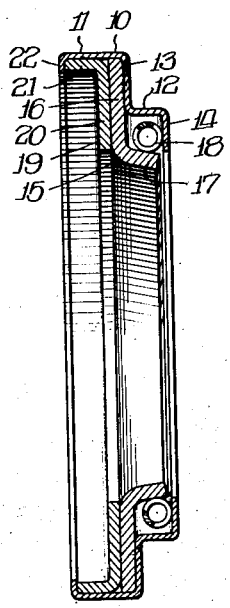
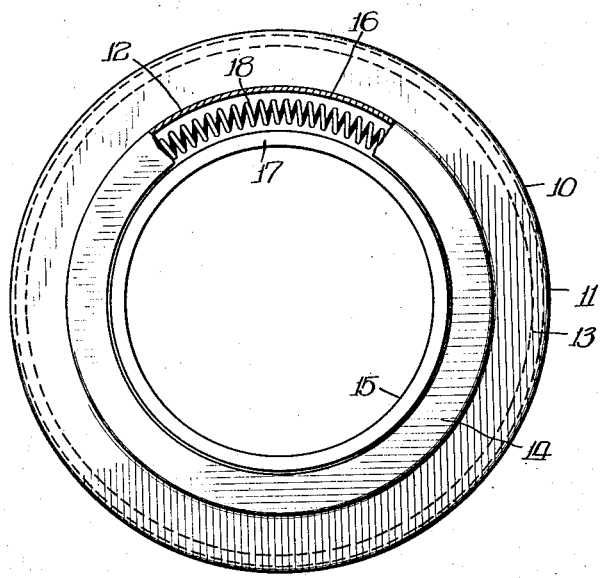
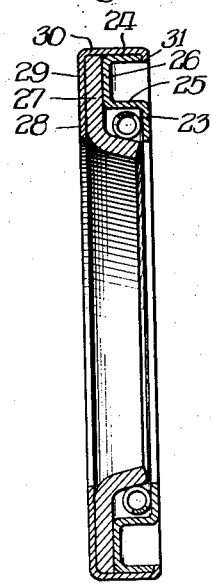
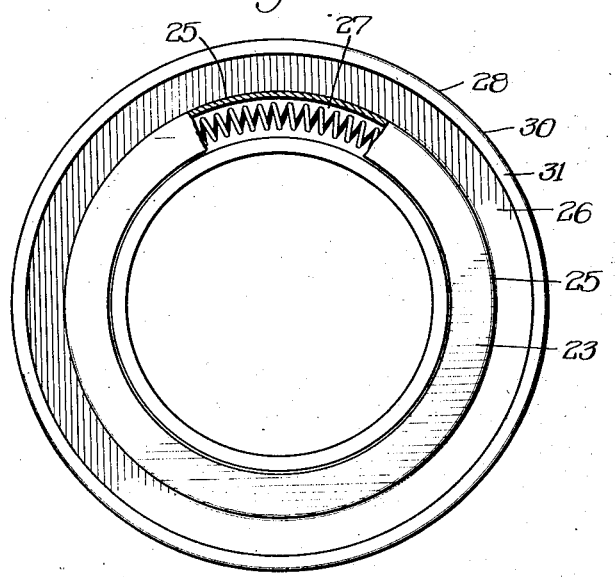
Inventor:
Harold A. Clark, Patented June 19, 1934

1,963,937

UNITED STATES PATENT OFFICE 1,963,937

OIL SEAL

Harold A. Clark, Northbrook, Ill., assignor to Chicago Rawhide Manufacturing Co., Chicago, Ill., a corporation of Illinois Application March 7, 1932, Serial No. 597,201

6 Claims. (Cl. 288—1)

The present invention relates to oil seals of the type commonly used in the ends of oil filled housings about moving shafts for the purpose of retaining the oil in the housings and prevent it from leaking out along the shafts.

The principal object of the invention is to provide a self-contained sealing unit which is extremely simple in construction, can be manufactured inexpensively from a minimum number of easily produced parts, will stand up under the most severe usage and will effectively prevent any seepage of oil.

Other more specific objects and advantages of the invention will be apparent to those skilled in the art upon a full understanding of the construction, arrangement and coaction of the parts which constitute the improved seal.

Two somewhat different structural embodiments of the invention are presented herein for the purpose of illustration, but it will of course be appreciated that the invention may be incorporated in still other structurally modified forms coming equally within the scope of the appended claims.

In the accompanying drawing:

Fig. 1 is a diagrammatic section through the improved seal, showing the same before insertion in a housing about a shaft;

Fig. 2 is an end view of the seal, with a portion of the casing broken away to show the interior; and Figs. 3 and 4 are views corresponding respectively to Figs. 1 and 2, showing a modified form of the invention.

The seal which is shown in Figs. 1 and 2 includes an outside sheet metal stamping 10 which has two cylindrical portions 11 and 12 of different diameters and a flat radially extending portion 13 which connects the two cylindrical portions. The two cylindrical portions are arranged in end to end relation, and the smaller portion 12 is provided at its far end with an inturned radially extending rim 14.

The stamping 10 contains a flanged sheet leather packing member 15 which is of substantially the same diameter as the larger cylindrical portion 11 of the stamping. The radially extending portion 16 of the packing is positioned flatly against the radially extending portion 13 of the stamping, with the axially extending portion 17 of the packing projecting into the hollow protective housing formed by the smaller cylindrical portion 12 and the end rim 14. The portion 17 of the packing is spaced a considerable distance inwardly from the portion 12 of the stamping and is encompassed by an endless coil spring 18 which presses inwardly on the packing and tends to seal the latter snugly against the shaft to which the unit is applied. The rim 14 serves to hold the spring in proper relation to the packing.

The packing 15 is clamped tightly against the stamping 10 by a second sheet metal stamping 19. The stamping 19 has a flat radially extending portion 20 which bears against the radially extending portion 16 of the packing throughout the greater portion of the area of the latter, and has a cylindrical portion 21 at its outer edge which fits snugly within the cylindrical portion 11 of the stamping 10 and terminates substantially even with the edge of the latter. The stamping 19 is held clamped against the packing by a small rim 22 on the edge of the cylindrical portion 11 which engages with the edge of the cylindrical portion 21.

The above described construction provides a very simple, strong and easily manufactured unit which will effectively serve the purpose for which intended. The unit is adapted to be fitted into a cylindrical seat in a tubular housing with the double-ply cylindrical portion of the unit in fluid-tight, preferably pressed-fit engagement with the seat.

The modified unit which is shown in Figs. 3 and 4, while having certain features of novelty in common with the first described unit, is structurally somewhat different.

This unit, like the first, includes a sheet metal stamping 23 which has two cylindrical portions 24 and 25 of different diameters which are connected by a radially extending portion 26 against which the radially extending portion 27 of the packing is firmly clamped. The two cylindrical portions, however, instead of being arranged in end-to-end relation, are disposed one within the other.

As in the first described unit, a second sheet metal stamping 28 is employed to complete the structure. This second stamping likewise has a radially extending portion 29 which bears against the radially extending portion 27 of the packing, but the cylindrical portion 30 of the second stamping, instead of fitting within the other stamping, is sleeved over the larger cylindrical portion 24 of the latter in tightly fitted engagement therewith and is provided with a small inturned rim 31 at its far edge which abuts against the edge of the cylindrical portion 24 to clamp the two stampings tightly together on the leather.

In the foregoing description the packing members have been referred to as being made of leather, but it will of course be understood that the use of other sealing materials is also contemplated.

I claim:

1. A self-contained seal for insertion as an assembled unit within a tubular housing in encompassing relation to a centrally located shaft, comprising a sheet metal stamping having two cylindrical portions of different diameters and a flat radially extending portion connecting the two cylindrical portions, a flanged packing of substantially the same diameter as the larger cylindrical portion positioned with the radially extending portion of the packing against the radially extending portion of the stamping and with the axially extending portion of the packing projecting into the smaller cylindrical portion of the stamping, a spring enclosed within the smaller cylindrical portion in encompassing relation to the packing, and a second sheet metal stamping having a cylindrical portion for tightly sleeved association with the larger cylindrical portion of the first stamping and having a flat radially extending portion in clamped engagement with the radially extending portion of the packing.

2. A self-contained seal for insertion as an assembled unit within a tubular housing in encompassing relation to a centrally located shaft, comprising a sheet metal stamping having two cylindrical portions of different diameters and a flat radially extending portion connecting the two cylindrical portions, a flanged leather packing of substantially the same diameter as the larger cylindrical portion positioned with the radially extending portion of the packing against the radially extending portion of the stamping and with the axially extending portion of the packing projecting into the smaller cylindrical portion of the stamping, an endless coil spring caged within the smaller cylindrical portion in encompassing relation to the packing, and a second sheet metal stamping having a cylindrical portion for tightly sleeved association with the larger cylindrical portion of the first stamping and having a flat radially extending portion in clamped engagement with the radially extending portion of the packing, said cylindrical portions of the first stamping projecting axially in opposite directions from the radially extending connecting portion, and said smaller cylindrical portion being provided at its far end with an inturned flange for abutment with the spring.

3. A self-contained seal for insertion as an assembled unit within a tubular housing in encompassing relation to a centrally located shaft, comprising a sheet metal stamping having two cylindrical portions of different diameters and a flat radially extending portion connecting the two cylindrical portions, a flanged leather packing of substantially the same diameter as the larger cylindrical portion positioned with the radially extending portion of the packing against the radially extending portion of the stamping and with the axially extending portion of the packing projecting into the smaller cylindrical portion of the stamping, an endless coil spring caged within the smaller cylindrical portion in encompassing relation to the packing, and a second sheet metal stamping having a cylindrical portion for tightly sleeved association with the larger cylindrical portion of the first stamping and having a flat radially extending portion in clamped engagement with the radially extending portion of the packing, said cylindrical portions of the first stamping being arranged one within the other, and said cylindrical portion of the second stamping being positioned about the larger cylindrical portion of the first stamping.

4. A self-contained seal, comprising an open centered cup-shaped sheet metal stamping, an open centered sheet leather packing having a radially extending outer portion which is seated against the bottom of the stamping and an axially extending inner portion which projects in the same direction as the rim of the stamping, a second open centered cup-shaped sheet metal stamping which is nested within the first stamping with the bottom of the second stamping clamped against the radially extending portion of the packing and with the rim of the same enclosed within the rim of the first stamping, and an endless coil spring mounted under tension on the axially extending portion of the packing, said second stamping being reversely cupped about its center for the retention of the spring.

5. A self-contained seal, comprising two centrally apertured generally cup-shaped sheet metal stampings, one of which is nested within the other, with the rims of both stampings pointing in the same direction, a centrally apertured packing having an outer radially extending portion which is clamped between the bottoms of the two cup-shaped stampings and having an inner axially extending portion, and spring means positioned about the axially extending portion of the packing for resiliently constricting the latter on a shaft, one of said stampings being provided with an integrally formed cage-like portion which is disposed substantially even with the edge of the axially extending portion of the packing and serves to retain the spring means in position thereon.

6. A self-contained seal, comprising a centrally apertured packing provided with an outer radially extending portion and an inner axially extending portion, two centrally apertured sheet metal members, one of which is a flat disk which has a flanged rim, and the other of which is a flat disk which has a flanged rim and a recessed center portion, said disks being clamped against opposite sides of the radially extending portion of the packing with the flanged rims of the disks in tightly sleeved engagement with each other and with the recessed portion of the second mentioned disk forming an enclosure about the axially extending portion of the packing, and a spring confined within said recessed portion in constricting relation to the axially extending portion of the packing.

HAROLD A. CLARK.